United States Patent Office

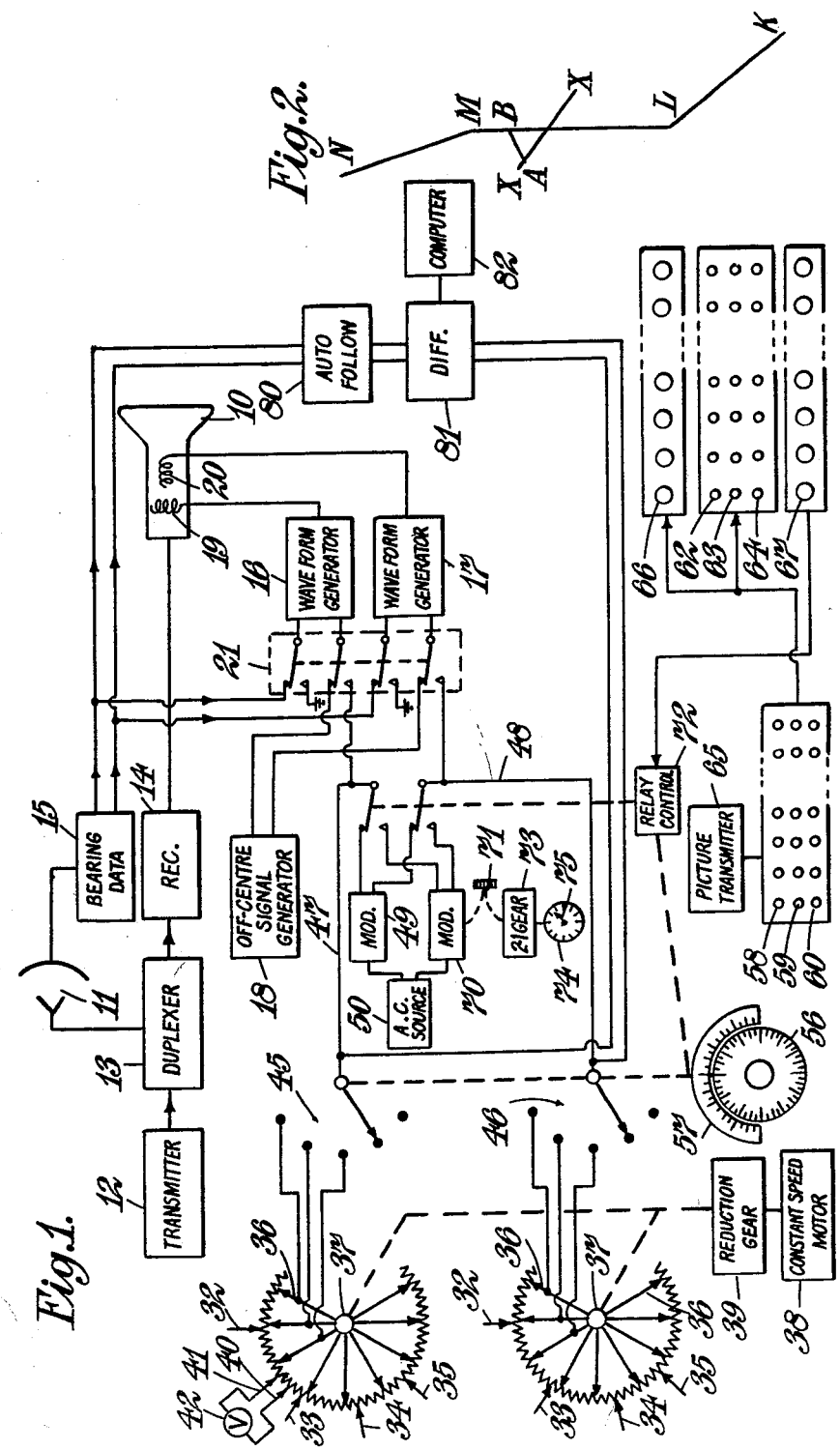

3,113,292
Patented Dec. 3, 1963

3,113,292
APPARATUS FOR AIR TRAFFIC CONTROL
Eric Parker, London, England, assignor to Decca Limited, London, England, a company of Great Britain
Filed Sept. 3, 1959, Ser. No. 837,964
Claims priority, application Great Britain Sept. 5, 1958
19 Claims. (Cl. 340—26)

This invention relates to apparatus for air traffic control and has for its principal object to provide improved means for facilitating the bringing in of aircraft for landing at appropriate time intervals or for controlling overflying or outward bound aircraft.

According to this invention, apparatus for air traffic control comprises a cathode ray display tube, marker signal generating means arranged to generate a number of marker signals each of which can be applied to the cathode ray tube to produce a marker which moves along a predetermined track across the face of the tube at a predetermined speed pattern, the various markers being arranged to follow one another at predetermined intervals, and switch means operative to select a particular marker signal and to apply it to the cathode ray tube. In the simplest case, if all aircraft inward bound to land at an airport were flying at the same speed and were arriving along the same route, then it would merely be necessary to generate a single series of marker signals which, if displayed on the tube, would move across the screen of the tube along a representation of this route at intervals corresponding to the required spacing of the aircraft. More generally, however, at any airport, there may be a number of approach routes or airways and aircraft may be flying at a number of different speeds along these routes. In referring to the speeds of different aircraft, it will be understood that each individual aircraft would not normally fly at a constant speed along the route to the airport but would employ some definite speed pattern dependent on, for example, the changes in altitude and the required reduction in speed for the final runway approach. To cater for different aircraft, signal generating means may be provided for generating markers representative of all the different speeds along all the various routes. Generally, however, a controller having a display tube as described above would be concerned only with one airway or inward bound route and the marker signal generating means may be arranged to generate a number of sets of markers corresponding to different speed-categories of aircraft. These marker signal generating means may have suitable adjusting means for setting the effect of wind into the signal generating means so as to space the various markers to allow for wind.

The cathode ray display tube may conveniently be a radar plan position display or it may be a plan position display tube on which selected information about the position of aircraft is displayed, this information being derived from radar apparatus or from other sources.

The aforementioned switch means for selecting a particular marker signal may conveniently comprise a rotary switch which may be provided with co-operating fixed and rotary scales to form a simple computer constituting a time table so that if the controller receives information that an aircraft is at a particular point, for example, over a specific radio beacon at a certain time, he may readily determine from the scales the appropriate arrival time at the airport. For example, one scale may be marked with distances along the airway whilst a co-operating scale may be marked with time intervals, the distance scale being made non-linear to allow for the change of speed of the aircraft along the track. The distance scale may have a number of different markings corresponding to the various different speed-categories of the aircraft but preferably separate scales are provided. In the latter case, the appropriate scale may be illuminated by the operation of switch means which also control the setting of the signal generating means to provide a marker of the appropriate speed-category. A set of interchangeable scales may be provided for different wind conditions.

The following is a description of one embodiment of the invention, reference being made to the accompanying drawings in which:

FIGURE 1 is a block diagram illustrating diagrammatically apparatus for air traffic control utilising radar information; and FIGURE 2 is an explanatory graphical diagram.

Referring to FIGURE 1, there is illustrated a cathode ray tube 10, the screen of which forms a display screen to be used by a controller for controlling aircraft flying along a particular route, for example a particular inward bound track to an airport. Any given airport may have a number of different approach routes and, in the following description, it will be assumed, for simplicity, that separate display tubes are provided for the use of separate controllers controlling aircraft along these various routes. On the display tube 10 is displayed radar information about the position of aircraft, this information being obtained from radar apparatus indicated diagrammatically as comprising a continuously rotatable scanning antenna 11 which is fed with short duration pulses of microwave energy from a transmitter 12 via a duplexer 13. Echoes of these pulses from distant targets are received by the antenna 11 and fed through the duplexer 13 to a receiver 14 and thence to the display tube 10. This display tube gives a plan position display and, to effect the scanning of the cathode ray beam, the bearing data transmitter 15 feeds signals representative of the sine and cosine of the angle of the angular position of the antenna 11 to two waveform generators 16, 17 respectively. These waveform generators are arranged to produce repetitive sawtooth waveforms synchronised with the transmitted pulses, the waveform from each waveform generator having a slope controlled by the voltage applied to a rate control input of the waveform generator and having a starting level controlled by the voltage fed to a shift control input. Such a system for feeding fixed deflector coils of a cathode ray tube to produce a radar plan position display is described in further detail in the specification of application No. 661,699. The sine and cosine signals from the bearing data transmitter 15 are fed to rate control inputs of the respective scanning signal waveform generators 16, 17 and off-centering signals from an off-centering signal generator 18 are fed to the shift control inputs of the two scanning signal waveform generators. These two scanning signal generators 16, 17 produce repetitive sawtooth waveforms which are fed to orthogonal deflection coils 19, 20 for the cathode ray tube 10. Electronic switch means 21 are provided for feeding further different control signals into the waveform generators 16, 17 during the intervals between the radar display scans so that marker traces may be displayed on the cathode ray tube 10 during these intervals. For the purpose of the present description it is only necessary to consider one additional set of marker signals but a number of different markers may be displayed on the screen of the tube, for example, by feeding separate different marker control signals to the waveform generators in sequence in the successive intervals between radar display scans.

In the arrangement of FIGURE 1, the marker signal generating means, as will be described in detail later, apply control signals to the waveform generators 16, 17 so as to produce marker signals which travel across the screen of the tube 10 along a predetermined path, corresponding to the required route of the aircraft on the plan position display, with the markers travelling at a predetermined rate and following one another at predetermined intervals. It might, for example, be decided that aircraft can be landed at an airport at intervals of two minutes. In this case the markers will be arranged to travel across the face of the tube at intervals of two minutes. It will be appreciated that aircraft may approach the airport on different routes. Thus any one controller may be able to use only some of the landing times corresponding to the various markers defining possible programmes. If there are a number of controllers as described above, the supervisor would allocate landing times to particular controllers on request in a manner to be described later. The controller would then have to ensure that the approaching aircraft under his control travel according to the programme defined by ahe appropriate markers moving across the display screen so that the aircraft arrive at the airport at the appropriate times.

For generating the markers defining the possible programmes there is shown in FIGURE 1 a pair of potentiometers 30, 31 having circular tracks and of uniform resistance along their length. Each potentiometer has a number of tapping points 32, 33, 34, 35 which are similarly spaced on the two potentiometers. Each potentiometer also has a number of wiper arms 36 which are evenly spaced angularly about the axis of a driving shaft 37. The wiper arms on the two potentiometers are most conveniently arranged on a common driving shaft which is driven by a constant speed drive motor 38 through a reduction gear 39. The two poteniometers are associated respectively with the two co-ordinates of a Cartesian co-ordinate system defining the programmed tracks and, for this purpose, to the taps 32, 33, 34 and 35 of the two potentiometers are applied voltages representative of the respective co-ordinates in the Cartesian co-ordinate system of four points along the required route of the aircraft. Such a track is illustrated diagrammatically in FIGURE 2 by the path KLMN consisting of three straight lines defining a route with turning points at L and M. To the taps 32 of the two potentiometers are applied voltages representative of the two co-ordinates defining the point K representing the beginning of the inbound route. To the taps 33 and 34 are applied voltages representative of the turning points L and M, whilst to taps 35 are applied voltages representative of a point N which is the final point on the route so far as the controller is concerned. It will be understood that any number of taps might be provided corresponding to the ends of various straight legs of a required route and that the four taps 32 to 35 are illustrated merely as an example. It will be immediately apparent that if the voltages on taps 32 of the two potentiometers were applied to the respective shift control inputs on the two waveform generators 16, 17, a marker trace would be produced on the screen of the cathode ray tube 10 at a point corresponding to the point K on the route. Similarly if the voltages at any of the other taps are applied to the waveform generators 16, 17 they would produce marker traces at the various other points L, M, N, on the screen of the tube. The taps 32, 33, 34 and 35 are adjusted in position along the potentiometer track so that they are spaced apart by amounts corresponding to the time required for aircraft to fly between the corresponding points along the route. It will thus be seen that if one wiper 36 on the potentiometer 30 is considered in conjunction with the correspondingly positioned wiper on potentiometer 31, these two wipers 36 as they traverse along the potentiometers, will pick up voltages representative of the gradually changing position of an aircraft assuming the aircraft flew along the route K, L, M, N, at the programmed speed and followed the route exactly. By suitable timing of the instant when the wipers pass datum positions, it can be ensured that the voltages picked up by these two wipers 36 correspond to programmes giving some predetermined arrival time at the airport. The various wipers 36 are spaced apart in accordance with the required time spacing of programmed arrivals. Thus, since the various wipers 36 are evenly spaced apart, they will develop voltages corresponding to a series of programmed arrivals of aircraft at two minute intervals. The number of wiper arms 36 required will thus depend on the number of possible programmes in the time taken for one complete revolution of the driving shaft 38.

Different aircraft may fly at different speeds and in practice it may be necessary to have, say, three pairs of potentiometers 30 and 31 all having similarly spaced wipers mounted on a common shaft, but with the various taps 31 to 35 spaced apart differently according to the different programmed speed-patterns of aircraft in different speed-categories and over different sections of the route. It will also be necessary to allow for the wind speed on each section of the route and this may most conveniently be done by adjustment of the positions of the taps 32 to 35. It will be appreciated that since specific input voltages are applied to these taps corresponding to the various points along the aircraft route, no matter where these taps are positioned on the potentiometers 30, 31 they will always, when a wiper 36 passes a tap, provide at that wiper the voltage representative of the particular point along the aircraft route corresponding to that voltage. Thus if, for example, the taps 32 and 33 were put closer together, the wiper 36 traversing along this section of the potentiometer would pass from the tap 32 to the tap 33 in a shorter time, thus corresponding to a greater flying speed along the portion of the aircraft route K, L. It is thus merely necessary to position the various taps according to the required speed allowing for any wind. If the potentiometers 30, 31 each has a uniform resistance along its length the current through each section of a potentiometer is a measure of the speed of aircraft for which the taps have been adjusted. The current is proportional to the component, in the relevant co-ordinate direction, of the programmed speed. Thus very conveniently current measuring devices are provided so that the programmed speeds set into the potentiometers by the positioning of the taps 32—35 can be directly indicated; the current measuring devices conveniently are meters calibrated directly in terms of speed. Since it is not generally convenient to include current meters in series in the potentiometer circuit, the current in each of the various sections of each potentiometer may be measured by tapping the potentiometer at two points a fixed distance apart in the section and measuring the voltage between these taps with a voltmeter. The voltmeter may then be directly calibrated in terms of speed over the relative section and thus to adjust the taps 32 to 35 according to a required programme speed, it is merely necessary to move the taps until the voltmeters in the various sections indicate the appropriate speeds. For simplicity in FIGURE 1, only one such programme speed indicating circuit is shown; two taps 40, 41 for measuring the speed are indicated diagrammatically as being connected to a voltmeter 42 which would be calibrated to indicate speed directly. Since the still air speed is known, the meter may be biased to read directly in head or tail wind speeds. As previously stated the spacing between the successive taps 32 to 35 corresponds to the times required to fly the successive legs along the route and a calibrated scale or scales may be provided so that the times for the various legs can be read directly from the scale or scales. Thus if the air-speed of the aircraft is known, by measuring the time required for it to fly along a leg of the route, the wind component along that leg can be determined by setting the taps to this time and reading the voltmeter 42.

The voltages at the various wipers 36 are fed to the fixed contacts of two ganged rotary selector switches 45, 46 and the controller by operating these switches can apply the output voltages from any selected pair of wipers 36 corresponding to any selected programme to leads 47, 48 for application to the shift control inputs of the waveform generators 16, 17. These output voltages are applied via the aforementioned electronic switch 21 to the waveform generators 16, 17 during the intervals between the radar display scan so that they produce a marker trace. Most conveniently the marker trace is a circle or ellipse and this may conveniently be effected by phase quadrature modulation of the control signals on leads 47, 48 by means of a modulator 49 fed from an alternating current supply source 50. It will thus be apparent that the controller, by selecting in turn the various programmes using the switches 45, 46, can see which programme is the most convenient for any given aircraft displayed as a radar response on the display screen 10. It may happen, however, that the controller is receiving information about aircraft positions from some source other than the radar equipment; he may, for example, receive information that an aircraft is at a particular point, for example over a specific radio beacon, at a certain time. The ganged switches 45, 46 have a rotary control knob 55 carrying a rotary scale 56 co-operating with a fixed scale 57. One of these scales, conveniently the rotary scale 56, is marked with distances along the airway, whilst the other scale is marked with time intervals. The distance scale may be made non-linear to allow for change of speed of the aircraft along the route as may occur, for example, during successive stages of the flight (e.g. climb, curise and descent). The distance scale may have a number of different markings corresponding to the various different speed-categories of aircraft but, for simplicity in the drawing, only one set of markings is shown. The various markings for different speed-categories may be put on separate scales of which the appropriate scale can be selectively illuminated by the operation of a selector switch (not shown) which also controls the connection of the appropriate marker signal generating means for providing programme markers of the appropriate speed-category. To use the co-operating scales 55, 56 the controller merely has to set the control knob 55 for the switches 45, 46 so that the scale mark corresponding to the reported time is aligned with the scale mark on the distance scale representing the reported distance. In general, the control knob 55 would be between switch settings on the switches 45, 46 and the controller has to determine which would be the nearest suitable programme for the aircraft to use. A set of interchangeable distance scales may be provided for use in different wind conditions.

Having thus determined the programme which the aircraft could use to land at the airport, assuming that a number of different inbound routes are in use with separate controllers for each route, the controller must first ensure that this programmed arrival time which he has selected is not required for some other aircraft on a different route. In the particular embodiment being described, it is assumed that there are a number of separate controllers each with their own display equipment and a supervisor having overall control to allocate landing times to the various different controllers. The aforementioned rotary switches 45, 46 with their control knob 55 might be arranged to operate an indicator, for example a lamp on a display board, at the supervisor's position. It is more convenient, however, if each controller can operate his switch control knob 55 freely to display different markers on his display tube 10. He can thus more readily decide which is the most convenient programmed landing time for each aircraft under his control. If this is to be possible, the switch 56 cannot be arranged automatically to operate an indicator at the supervisor's position and the controller must separately request the supervisor for allocation of the appropriate landing time. For this purpose each controller is provided with a number of sets of jacks 58, 59, 60 each associated with a separate indicator at the supervisor's position. The various separate sets of jacks 58, 59, 60 correspond to different speed-categories of aircraft and each set has a number of jacks corresponding to different possible landing times. In a typical case if aircraft can land at intervals of two minutes, there might be thirty jacks in each set so that each jack in the set corresponds to a specific landing time within a period of one hour. The various jacks could thus be labelled 0, 2, 4 . . . , corresponding to the minutes past the exact hour. The controller puts a plug in the jack corresponding to the programmed time and speed-category for which he requires permission to land an aircraft and this causes a corresponding lamp to light at the supervisor's position. In FIGURE 1 three such rows of lamps 62, 63, 64 are indicated digrammatically correspond to the three speed-categories of aircraft represented by the three sets of jacks. The number of lamps in each set would, of course, correspond to the number of jacks in each set at the controller's position. In addition to operating a lamp on the display board for the supervisor, the plug and jack assembly at the controller's position may be arranged to complete a transmission link for a visual data transmission system 65 comprising a cathode ray tube forming a flying spot scanner for scanning a transparency carrying written information. The light transmitted through the transparency is picked up by a photo-cell to provide a video signal which may be amplified for transmission to a remote information display tube. Such a data transmission system is described, for example, in co-pending British Patent No. 822,769. By means of this data transmission system, information about the appropriate flight may be transmitted to a display screen on the supervisor's board. The video signals as well as direct current signals for an indicator may readily be transmitted through a plug and jack. For air traffic control, only brief details, for example the identity of the aircraft, would normally be required by the supervisor and the display screen at the supervisor's position in a typical case might be a small cathode ray tube having a diameter of the order of a few inches. There are shown in FIGURE 1 a series of such display screens 66 at the supervisor's position, one associated with each landing time so that the appropriate information on all aircraft due to arrive is displayed. As previously indicated, the supervisor's board may only cover a limited period of time, for example one hour and the number of indicators 62, 63, 64 in each set and the number of display screens 66 would depend on the maximum rate at which aircraft are to be brought into the airport.

To enable the supervisor to indicate to a controller whether any requested landing time can be allocated to that controller, there is provided on the supervisor's board, for each landing time, a rotary switch 67 which can be set to any one of a number of positions corresponding to each speed-category for each of the different controllers. Thus, for example, if there were five controllers and each dealt with aircraft in three different speed-categories, the switch would have fifteen positions. Each rotary switch 67 would, when turned to a position corresponding to one controller, indicate to that controller that he could have a particular landing time for an aircraft of a particular speed-category and might also change the indicator lamp in the appropriate one of the sets 62 to 64 on the supervisor's board, for example by illuminating different coloured lamps, so as to show that that landing time is now engaged.

The operation of the rotary switches 67 is also arranged to put a distinctive marker on the controller's cathode ray tube to indicate the programme which is now being allocated. As previously stated, the controller's marker initially was a circle or ellipse and, conveniently, the operation of the supervisor's switch is arranged to put on a straight line marker. This may be achieved by modulating the output on the aforementioned leads 47, 48 with in-phase signals from a modulator 70, the relative amplitudes of the signals being controlled by a control knob 71. The operation of the switch 67 may effect the switching by means of a relay or other switching device 72 connecting the modulator 70 in place of the modulator 49 to apply the modulation signals when the control knob 55 and thus the rotary switches 45, 46 are set to the position corresponding to the programme selected by the supervisor. It will be seen that by turning the control knob 71 the angular position of the straight line marker trace may be altered. Such a straight line marker has the advantage that it may conveniently be used in conjunction with a simple computer for facilitating the control of the aircraft if radar or other up-to-date information about the position of the aircraft is displayed on the controller's cathode ray tube. This information may, for example, show that the aircraft is not exactly on the required route and the controller has not only to bring the aircraft onto this route but to ensure that it is in such a position that it will arrive at the airport at the required time In a simple case the straight line marker might be arranged so that the centre point on the line moves along a required route at the required speed. Assuming that the aircraft is slightly ahead of the marked point on the route but to one side of the route, the line might be rotated by the controller so as to pass through the position of the aircraft. In FIGURE 2, the straight line marker is represented by the line XX with its midpoint O on the route line representing the programmed position of the aircraft. If the actual position of the aircraft is A, then, if an isosceles triangle BOA were drawn on the screen of the tube with the point B on the required track and the angles BOA equal to the angle BAO, the line AB gives the required direction for the aircraft to fly so as to reach a position where it is on the line BO, that is the desired route, coincident with the position of the marker. It will readily be seen that the angular direction AB is related to the direction OA since the direction AB rotates through twice the angle through which the line OA is turned. Hence the computer in this case might be a simple disc having a scale with a co-operating fixed pointer (or a rotatable pointer with a fixed scale), the scale extending from 0 to 360° twice in one complete revolution. Preferably, however, a two to one gear ratio in a gear box 73 is employed so that the indicator scale 74 may be a simple scale extending from 0 to 360° in one revolution over which traverses a pointer 75 driven from the knob 71 via the gear box 73. It will readily be seen that such a simple computer will also facilitate the controlling of an aircraft along a zig-zag course if it is necessary for aircraft to be delayed slightly in order to arrive at the appropriate arrival time.

It often happens that a required inbound route to an airport is not straight but at one or more points, changes direction. The above described form of computer can be used, as the aircraft approaches a corner, to cut the corner or stretch the corner, as appropriate, to get the aircraft on the new track flying in accordance with the programme. To stretch the corner, the centre of the straight line marker is made to move towards the corner along a backward extension from the corner of the new track whilst to cut the corner, the aircraft, before it reaches the corner, is controlled in the manner described above by reference to a straight line marker already moving along the new leg of the route beyond the corner.

This straight line marker can also be used as a collision warning device. If some other aircraft is seen to be approaching a programmed position, the straight line can be set to point at that other aircraft. It is thus readily possible to determine if the bearing of this other aircraft from the programmed position of the controlled aircraft changes or not. If the other aircraft remains on the marker line, the bearing is not changing. In that case, the programmed position is not safe because of the risk of collision and the controller can then take appropriate action.

A fully automatic computer may be provided to determine and, if necessary, to transmit to the aircraft instructions about the heading to be flown. For this purpose there may be provided an auto-follow system 80 to which the radar information from the receiver 14 and bearing data transmitter 15 is fed, which auto-follow system provides two output signals representative of the position of the aircraft in a rectangular Cartesian co-ordinate system. These co-ordinate outputs may alternatively be obtained from manual tracking, for example, by moving an electronic marker on a cathode ray tube radar plan position display to follow the aircraft. The co-ordinates representative of the actual position of the aircraft are then compared, in a difference unit 81, with the co-ordinates, at the same instant, of the desired position of the aircraft on the leads 47, 48. The differences are fed to an analogue computer 82 in which the required change in heading is calculated. It will be appreciated that the ratio of the differences between the actual position and the programmed position in the two co-ordinate directions will give the direction of the aircraft positional error whilst the modulus of the two differences will give the magnitude of the aircraft positional error. From these quantities the required heading may be calculated in a manner analogous to that employed in the simple computer constituted by the scale 74 and pointer 75. Instead of or additionally to the computer 82, it may in some cases be desired to have a warning system operative to give an audible or visual indication when an aircraft being tracked diverges more than a predetermined amount from the programmed route. This may readily be achieved by providing an alarm operated by a signal derived from the two outputs of the difference unit 81.

I claim:

1. Apparatus for air traffic control comprising a cathode ray tube having a display screen and deflector means for deflecting the cathode ray beam, two potentiometers each having a circular track traversed by a plurality of wiper arms, drive means for continuously rotating said wiper arms, a plurality of taps on each of said potentiometers, means for applying voltages to said taps corresponding in magnitude, for corresponding taps on the two potentiometers, to the two co-ordinates of a number of points along the required route of an aircraft, circuit means for applying the voltages developed at a pair of corresponding wipers on said two potentiometers to said deflector means to control the deflection of the cathode ray beam whereby each pair of wipers can control the position of a marker on the display screen which marker is gradually moved across the screen as the wiper arms are rotated, and switch means for selectively applying the voltages from a selected pair of wiper arms, one on each potentiometer, to said circuit means to select a particular marker.

2. Apparatus as claimed in claim 1 wherein said switch means for selecting a particular marker signal comprises a rotary switch provided with co-operating fixed and rotary scales, one scale being marked with time intervals and the other with distances along the route.

3. Apparatus as claimed in claim 2 wherein the distance scale is made non-linear to allow for the change of speed of the aircraft along the route.

4. Apparatus as claimed in claim 2 wherein interchangeable distance scales are provided for different wind conditions.

5. Apparatus as claimed in claim 2 wherein separate marker signal generating means are provided for different speed-categories of aircraft and wherein a plurality of separate distance scales are provided corresponding to the various different speed-categories of the aircraft.

6. Apparatus for air traffic control comprising a cathode ray tube having a display screen; marker signal generating means for generating a number of similar marker signals for application to said tube to produce a marker on the display screen, which marker signal generating means comprise, for each of two orthogonal directions in a Cartesian co-ordinate system, a potentiometer with at least two taps which potentiometer has a uniform impedance, means for applying voltages to said taps representative in magnitude of the successive values at a number of points along the required route of an aircraft of one of the co-ordinates of the points and a plurality of wiper arms spaced apart and driven along said potentiometer at a uniform speed; deflection means for deflecting the beam of the cathode ray tube across said screen; means for applying the voltages at said wiper arms of the two potentiometers to said deflection means to control the corresponding co-ordinates of the markers on the display and switch means operative to select a particular marker signal and to apply it to the cathode ray tube.

7. Apparatus as claimed in claim 6 wherein said taps are adjustable to enable the spacing of the markers on the display screen to be adjusted according to the speed of the aircraft and the wind conditions.

8. Apparatus as claimed in claim 7 wherein indicating means are provided for indicating the current through the various sections between the taps of each potentiometer.

9. Apparatus as claimed in claim 7 wherein a calibrated scale is provided to indicate the spacing between the taps.

10. Apparatus for air traffic control comprising a cathode ray tube having a display screen and deflector means for deflecting the cathode ray beam, two potentiometers each having a circular track traversed by a plurality of wiper arms, drive means for continuously rotating said wiper arms, a plurality of taps on each of said potentiometers, means for applying voltages to said taps corresponding in magnitude, for corresponding taps on the two potentiometers, to the two co-ordinates of a number of points along the required route of an aircraft, marker signal generating means for deflecting the cathode ray beam to produce a marker on the display screen in a co-ordinate position controlled by two input control voltages, and switch means for selectively applying the voltages from a selected pair of wiper arms, one on each potentiometer, to said marker signal generating means as input control voltages to cause a marker to traverse across the screen as the wipers are rotated.

11. Apparatus as claimed in claim 10 wherein means are provided operable to change the form of any selected marker on the display.

12. Apparatus as claimed in claim 10 wherein said marker signal generating means are arranged to produce a straight line marker trace on the display screen with its center point at a position on the display screen corresponding to the co-ordinates represented by the magnitudes of the wiper arm voltages.

13. Apparatus as claimed in claim 10 wherein means are provided for rotating said straight line trace about its center point.

14. Apparatus for air traffic control comprising a cathode ray tube having a display screen, means for displaying on said display screen information representative of the plan position of an aircraft, two potentiometers having a plurality of wiper arms, drive means for continuously driving said potentiometers, corresponding pluralities of taps on said potentiometers, means for applying voltages to said taps representative in magnitude, for each corresponding pairs of taps, to the co-ordinates of a number of points along the required route of an aircraft, marker signal generating means for producing a marker trace on the display screen in a co-ordinate position corresponding to the magnitudes of two input control voltages, and selector switch means for selectively applying the voltages developed at a selected pair of wiper arms to said marker signal generating means.

15. Apparatus as claimed in claim 14 wherein said potentiometers have uniform impedances per unit length along their whole length and wherein said taps are adjustable along the length of the potentiometers.

16. Apparatus as claimed in claim 15 wherein calibrated scales are provided for indicating the tap spacing.

17. Apparatus as claimed in claim 15 wherein indicating means are provided for indicating the current through the various sections between the taps of each potentiometer.

18. Apparatus as claimed in claim 14 wherein said cathode ray tube comprises a radar plan position display.

19. Apparatus as claimed in claim 14 wherein said switch means comprises a rotary switch provided with cooperating fixed and rotary scales, one scale being marked with time intervals and the other with distances along the route.

References Cited in the file of this patent

UNITED STATES PATENTS

| | | |
|---|---|---|
| 2,172,395 | McSpadden | Sept. 12, 1939 |
| 2,613,352 | Kellogg | Oct. 7, 1952 |
| 2,663,868 | Tasker | Dec. 22, 1953 |
| 2,694,160 | Rea | Nov. 9, 1954 |

FOREIGN PATENTS

| | | |
|---|---|---|
| 654,302 | Great Britain | June 13, 1951 |